United States Patent
Hori et al.

(10) Patent No.: US 11,371,618 B2
(45) Date of Patent: Jun. 28, 2022

(54) LIQUID AGENT APPLICATION METHOD, LIQUID AGENT APPLICATION MACHINE, AND LIQUID GASKET

(71) Applicant: NIDEC CORPORATION, Kyoto (JP)

(72) Inventors: Yuta Hori, Kyoto (JP); Masaji Nakatani, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 30 days.

(21) Appl. No.: 16/790,732

(22) Filed: Feb. 14, 2020

(65) Prior Publication Data

US 2020/0309271 A1    Oct. 1, 2020

(30) Foreign Application Priority Data

Mar. 29, 2019  (JP) .............................. JP2019-067235

(51) Int. Cl.
| | |
|---|---|
| *F16J 15/46* | (2006.01) |
| *B05D 1/36* | (2006.01) |
| *B05D 1/26* | (2006.01) |
| *B05C 5/02* | (2006.01) |
| *B60J 10/34* | (2016.01) |

(52) U.S. Cl.
CPC ................ *F16J 15/46* (2013.01); *B05D 1/26* (2013.01); *B05D 1/36* (2013.01); *B05C 5/02* (2013.01); *B60J 10/34* (2016.02)

(58) Field of Classification Search
USPC ......................................................... 427/58
See application file for complete search history.

(56) References Cited

U.S. PATENT DOCUMENTS

| | | | | |
|---|---|---|---|---|
| 5,882,729 | A  * | 3/1999 | Kahl ................... | H05K 9/0015 427/265 |
| 6,348,234 | B1   | 2/2002 | Ozono et al. | |
| 6,420,649 | B1 * | 7/2002 | Kahl ................... | H05K 9/0015 174/377 |
| 7,226,635 | B2 * | 6/2007 | Machida ............. | H01M 8/0271 427/115 |
| 10,421,096 | B2 * | 9/2019 | Trend ................... | B05C 5/0216 |

(Continued)

FOREIGN PATENT DOCUMENTS

| | | |
|---|---|---|
| CN | 103008167 A | 4/2013 |
| JP | 2002-174343 A | 6/2002 |

(Continued)

*Primary Examiner* — Brian K Talbot
(74) *Attorney, Agent, or Firm* — Hauptman Ham, LLP

(57) ABSTRACT

An application method of applying a liquid agent includes determining any one of positions of the liquid agent at a halfway part between a first end portion and a second end portion in a state in which an application is completed as each of an application start position and an application end position. The method includes applying the liquid agent from the application start position to the first end portion. The method includes turning back from the first end portion and applying the liquid agent to the second end portion, including superimposing, in a height direction, the liquid agent on previously applied liquid agent. The method includes turning back from the second end portion and applying the liquid agent to the application end position, including superimposing, in the height direction, the liquid agent on previously applied liquid agent.

6 Claims, 3 Drawing Sheets

(56) References Cited

U.S. PATENT DOCUMENTS

| | | | | |
|---|---|---|---|---|
| 2002/0093757 | A1* | 7/2002 | Daniel | G11B 25/043 |
| | | | | 360/99.22 |
| 2003/0231985 | A1* | 12/2003 | Schleifer | G01N 33/5304 |
| | | | | 422/400 |
| 2004/0057198 | A1* | 3/2004 | Kahl | H05K 9/0015 |
| | | | | 361/679.01 |
| 2012/0076949 | A1 | 3/2012 | Iwashima et al. | |
| 2013/0228953 | A1* | 9/2013 | Ikeda | B29C 64/112 |
| | | | | 264/401 |
| 2017/0313047 | A1* | 11/2017 | Kuo | B29C 64/336 |
| 2019/0274234 | A1* | 9/2019 | Starkovich | H01L 23/3737 |
| 2020/0413559 | A1* | 12/2020 | Lee | H04M 1/0202 |

FOREIGN PATENT DOCUMENTS

| | | |
|---|---|---|
| JP | 200845734 A | 2/2008 |
| JP | 2012-199455 A | 10/2012 |
| JP | 2013-142417 A | 7/2013 |
| JP | 2013186806 A | 9/2013 |
| JP | 2015-139725 A | 8/2015 |
| JP | 2018-34096 A | 3/2018 |

\* cited by examiner

LIQUID AGENT APPLICATION METHOD, LIQUID AGENT APPLICATION MACHINE, AND LIQUID GASKET

CROSS-REFERENCE TO RELATED APPLICATIONS

The present disclosure claims priority under 35 U.S.C. § 119 to Japanese Application No. 2019-067235 filed on Mar. 29, 2019, the entire content of which is incorporated herein by reference.

FIELD OF THE DISCLOSURE

The present disclosure relates to a liquid agent application method, a liquid agent application machine, and a liquid gasket.

BACKGROUND

Conventional devices that apply sealant by Formed In Place Gasket (FIPG) method or Cured In Place Gasket (CIPG) method have been known.

A relationship between elapsed time and a discharge amount at each of an application start and an application end is affected by characteristics of fluid (for example, viscosity) and characteristics of fluid supply means (pump), and a curve shape and a time required for gradient thereof change. Also, depending on the fluid or the fluid supply means (pump), the relationship between the elapsed time and the discharge amount at each of the application start and the application end changes each time the application is performed, and the curve shape and the time required for the gradient sometimes vary. Thereby, a tapered shape at each of the application start and the application end has various forms.

Since the tapered shape at each of the application start and the application end has various forms, application shapes at an application start position and an application end position vary greatly. In particular, in an application of a shape having ends, there has been a problem that dimensions of the application shape are not stable due to variation in shapes at the application start position and the application end position.

SUMMARY

An exemplary embodiment of the present disclosure is an application method of applying a liquid agent in a series in a shape having ends. The application method includes a determination process of determining any one of positions of the liquid agent at a halfway part between a first end portion and a second end portion in a state in which an application is completed as each of an application start position and an application end position, a first application process of applying the liquid agent from the application start position to the first end portion, a second application process of turning back from the first end portion and applying the liquid agent to the second end portion, and a third application process of turning back from the second end portion and applying the liquid agent to the application end position.

The above and other elements, features, steps, characteristics and advantages of the present disclosure will become more apparent from the following detailed description of the preferred embodiments with reference to the attached drawings.

DETAILED DESCRIPTION

Figure 1:
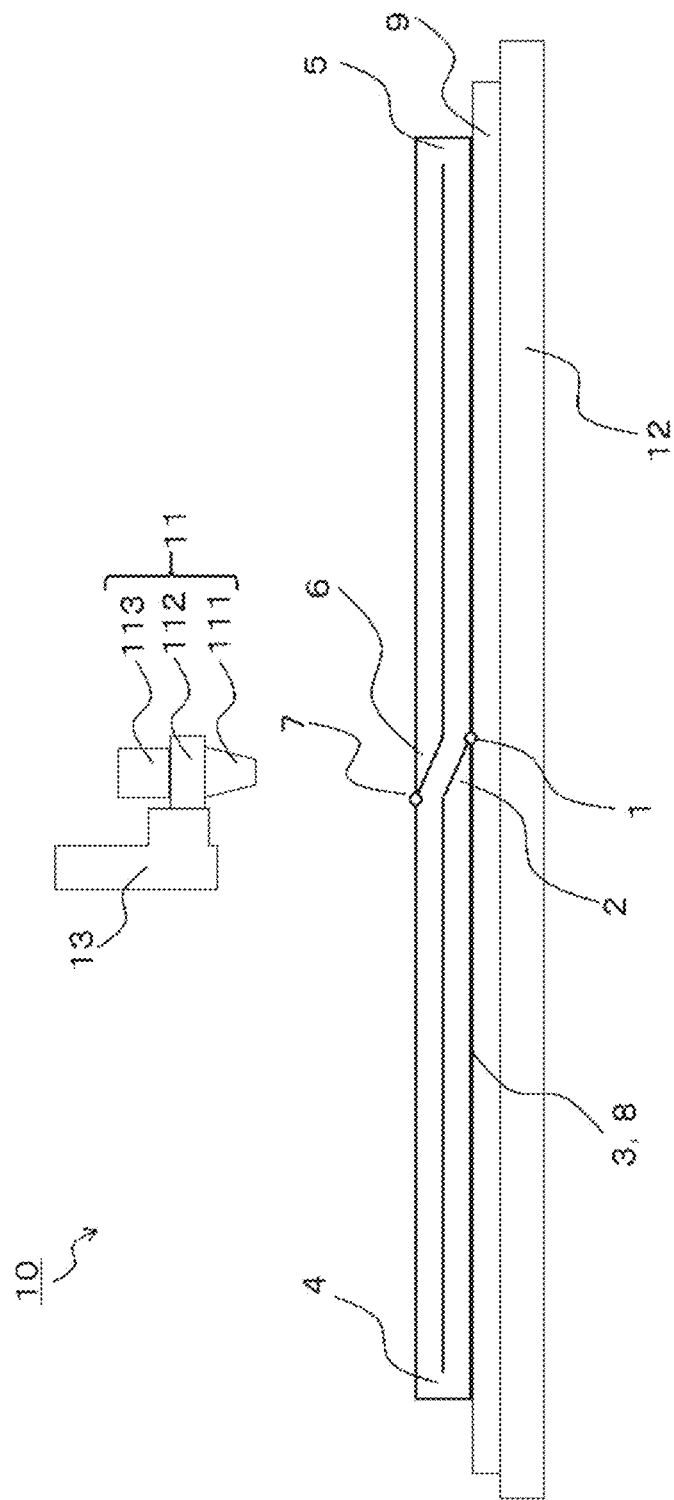
FIG. 1 is a schematic diagram of an application system according to an exemplary embodiment as viewed from a side.

FIG. 1 is a schematic diagram illustrating a liquid agent application device 10. The liquid agent application device 10 includes an application machine 11, a movement device 13 for relatively moving the application machine 11 and a work 9, a work placement portion 12 on which the work 9 is placed, and a control unit (not shown) for the application machine and the movement device.

The application machine 11 has a nozzle 111, a liquid agent storage portion 112, and a drive unit 113. The nozzle 111 and the liquid agent storage portion 112 are connected. A liquid agent is supplied to the nozzle from the liquid agent storage portion by the drive unit 113, and is applied to the work 9. Although an air cylinder is used as the drive unit 113, the drive unit is not limited to the air cylinder. A configuration in which a plunger is operated by a motor may be used. For example, a mechanism combining a motor and a ball screw or a mechanism combining a motor and a screw may be used.

The movement device 13 is connected to the application machine 11, and moves the application machine 11 along an X-axis, a Y-axis, and a Z-axis. The movement device is a motor, a linear actuator, or an articulated robot, and these may be appropriately combined. In the present embodiment, although the movement device 13 is connected to the application machine 11, the movement device 13 is not limited to this structure. The application machine 11 and the work 9 only need to be relatively movable, and for example, the movement device 13 may be connected to the work 9 or the work placement portion 12.

The work placement portion 12 has a chucking mechanism for the work 9. As the chucking mechanism, for example, an air suction method or a method of fixing the work with the linear actuator is used.

The control unit not shown controls the application machine 11 and the movement device 13 according to an application condition and a movement path. The application condition may be a condition in which a condition set in advance is read or may be a condition in accordance with a condition appropriately input by a user. The control unit may control the movement device 13 along the movement path set in advance, or may follow information input by the user appropriately operating an interface such as a controller.

Also a sensor for measuring the application conditions may be provided. The sensor may be used according to a purpose, such as a pressure sensor or an optical sensor. The control unit may perform processing such as changing the application conditions or the movement path according to an input signal from the sensor.

An application method with the application machine 11 will be described. When the drive unit 113 is driven, the liquid agent is pushed out from the liquid agent storage portion 112 and flows into the nozzle 111. When the drive unit 113 is further driven, the liquid agent is pushed out from the nozzle 111, and an application to the work 9 is started.

When the application is started, the movement device 13 moves the application machine 11 to perform the application in a desired shape.

The control unit not shown determines any one of positions of the liquid agent at a halfway part between a first end portion 4 and a second end portion 5 in a state in which the application is completed as each of an application start position 1 and an application end position 7. The application start position 1 and the application end position 7 may be set in advance, or may be appropriately input by the user.

A curable resin is used as an application liquid of the present embodiment. Specifically, a liquid gasket is used as the application liquid. The application liquid is not limited to the above structure, and may be, for example, an adhesive.

Figure 3:
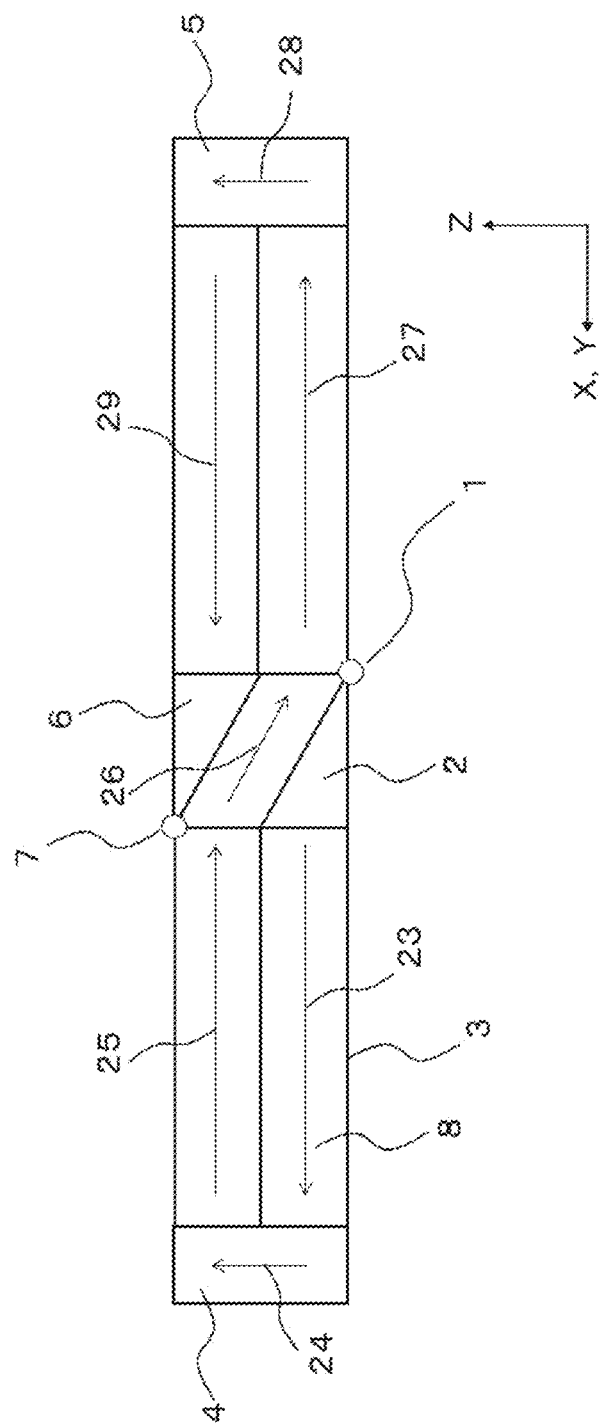
FIG. 3 is a schematic diagram for describing application processes.

Details of the application method will be described with reference to FIG. 3. In FIG. 3, in order to make application processes easy to understand, a schematic diagram divided into each part to which the application liquid is applied in each of the application processes is shown. A boundary line of each part is a schematic one, and each part is actually a continuous member.

As a first application process, the liquid agent is applied from the application start position 1 to the first end portion 4. Specifically, the application machine 11 is moved to the application start position 1 (step S1). The application machine 11 is moved in a first application amount adjustment portion 2 by the control unit (step S2).

In step S2, the application amount per unit length is gradually increased from an application start to a predetermined amount. In step S2, when the application amount per unit length becomes the predetermined amount, the application condition (output of the drive unit) is fixed, and the application machine 11 is moved to the first end portion 4 as shown by an arrow 23 while applying (step S3).

In step S2, the application condition may be controlled by the control unit so that the application amount is gradually increased. The control unit controls the application amount to be constant, and controls including a case where the application amount is gradually increased due to viscosity of the liquid agent or the like. A portion where the application amount per unit length is gradually increased from the application start to the predetermined amount in step S2 is the first application amount adjustment portion 2. That is, the first application process includes a process of forming the first application amount adjustment portion 2 in which the application amount per unit length is gradually increased. Thereby, the application amount at the application start is adjustable, and a height accuracy of the gasket is maintainable.

As a second application process, the liquid agent is turned back from the first end portion 4 and applied to the second end portion 5. Specifically, as shown by an arrow 24, the application machine 11 is moved to an upper side of the Z-axis and turned back to apply (step S4). As shown by an arrow 25, the application machine 11 is moved to apply so as to superimpose the liquid agent on an applied pattern (step S5). As shown by an arrow 26 and an arrow 27, the application machine 11 is passed the first application amount adjustment portion 2 and the application start position 1 and moved to the second end portion to apply (step S6).

As a third application process, the liquid agent is turned back from the second end portion 5 and applied to the application end position 7. Specifically, as shown by an arrow 28, the application machine 11 is moved to the upper side of the Z-axis and turned back to apply (step S7). As shown by an arrow 29, the application machine 11 is moved to apply so as to superimpose the liquid agent on an applied pattern (step S8). The application machine is moved to apply to the application end position 7 in a second application amount adjustment portion 6 by the control unit (step S9). At this time, the application amount per unit length has been gradually reduced. The application machine 11 is moved to the application end position 7, and the application is ended (step S10).

In step S9, the application condition may be controlled by the control unit so that the application amount is gradually reduced. The control unit controls the application amount to be constant, and controls including a case where the application amount is gradually reduced due to the viscosity of the liquid agent or the like. A portion where the application amount per unit length is gradually reduced from the predetermined amount to an application end in step S9 is the second application amount adjustment portion 6. That is, the third application process includes a process of forming the second application amount adjustment portion 6 in which the application amount per unit length is gradually reduced. Thereby, the application amount at the application end is adjustable.

A portion applied in steps S3, S5, S6, and S8 is a fixed amount portion 8. The fixed amount portion 8 is a portion where the application amount per unit length is the predetermined amount, in other words, a portion where a cross-sectional area is in a length direction. The length direction described above is a direction along the X-axis or the Y-axis. A halfway portion 3 is a portion where the fixed amount portion 8 is superimposed each other.

The first application process, the second application process, and the third application process include a process of forming the fixed amount portion 8 in which the application amount per unit length is the predetermined amount by Steps S3, S5, S6, and S8. The fixed amount portion 8 is sandwiched between the first application amount adjustment portion 2 and the second application amount adjustment portion 6 by applying according to each step. Thereby, the liquid agent after the application becomes constant height.

Figure 2:
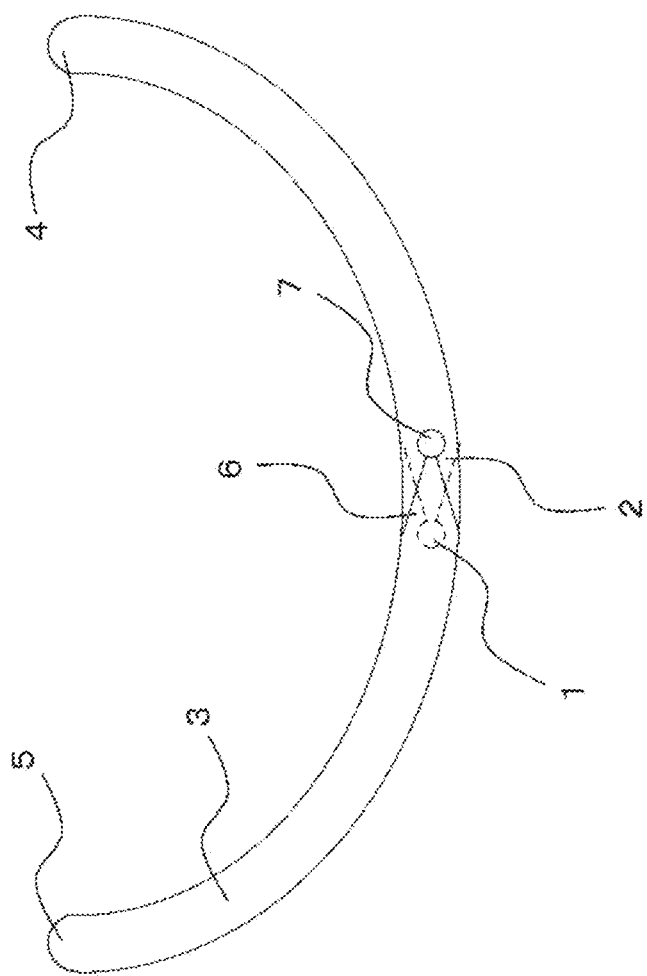
FIG. 2 is a schematic view of a liquid gasket according to the exemplary embodiment as viewed from above.

A shape of the liquid gasket will be described in detail with reference to FIG. 2. The gasket according to the exemplary embodiment of the present disclosure has, for example, an arc shape as shown in FIG. 2, and the halfway portion 3 is disposed between the first end portion 4 and the second end portion 5. The application start position 1 and the application end position 7 are disposed in the halfway portion 3 between the first end portion 4 and the second end portion 5 in an application shape, respectively. It is preferable that the first application amount adjustment portion 2 and the second application amount adjustment portion 6 are not superimposed on the first end portion 4 and the second end portion 5. It is preferable that the application start position 1 and the application end position 7 are positions each having a smaller curvature than those of other portions in the application shape. Thereby, an influence of a stringiness at the application end is reducible.

The application start position 1 and the application end position 7 may be superimposed on each other. It is preferable that the first application amount adjustment portion 2 and the second application amount adjustment portion 6 are superimposed on each other. A portion where the application amount of the second application amount adjustment portion 6 is reduced is superimposed on a portion where the application amount of the first application amount adjustment portion 2 is increased, and the liquid agent after the application becomes constant height. A term "constant height" described above also includes substantially equal heights including tolerances.

Furthermore, it is preferable that the application start position 1 and the application end position 7 are linear positions in the application shape, respectively. Thereby, the influence of the stringiness at the application end is further reduced.

The liquid gasket has a shape having ends, and has the first application amount adjustment portion 2, the second application amount adjustment portion 6, the halfway portion 3, the first end portion 4, and the second end portion 5. The first end portion 4 is arranged on one side. The second end portion 5 is arranged on the other side. The halfway portion 3 connects the first end portion 4 and the second end portion 5. The fixed amount portion 8 has the cross-sectional area that is in the length direction. Each of the first application amount adjustment portion 2 and the second application amount adjustment portion 6 has a cross-sectional area that changes in the length direction.

The halfway portion 3 has a portion in which at least a part of the fixed amount portion 8 is superimposed on each other in a height direction. The halfway portion 3 has a portion in which the fixed amount portion 8 is disposed between the first application amount adjustment portion 2 and the second application amount adjustment portion 6 in the height direction.

While the exemplary embodiments of the present disclosure have been described above, it is to be understood that the embodiments may be modified in various ways within the scope of the present disclosure.

The present disclosure is applicable to a liquid agent application machine, a liquid agent application method, and a liquid gasket.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An application method of applying a liquid agent in a series in a shape having ends, the application method comprising:
 a determination process of determining any one of positions of the liquid agent at a halfway part between a first end portion and a second end portion in a state in which an application is completed as each of an application start position and an application end position;
 a first application process of applying the liquid agent from the application start position to the first end portion;
 a second application process of turning back from the first end portion and applying the liquid agent to the second end portion; and
 a third application process of turning back from the second end portion and applying the liquid agent to the application end position,
 wherein
  at least a part of the liquid agent applied in the second application process is superimposed on the liquid agent applied in the first application process in a height direction,
  at least a part of the liquid agent applied in the third application process is superimposed on the liquid agent applied in the second application process in the height direction,
  the first application process includes forming a first application amount adjustment portion that gradually increases the application amount per unit length,
  the third application process includes forming a second application amount adjustment portion that gradually reduces the application amount per unit length, and
  the first application amount adjustment portion and the second application amount adjustment portion are superimposed.

2. The application method according to claim 1, wherein the first application process, the second application process, and the third application process include a fixed amount application process of forming a fixed amount portion in which the application amount per unit length is a predetermined amount, and
 the fixed amount portion is sandwiched between the first application amount adjustment portion and the second application amount adjustment portion.

3. The application method according to claim 1, wherein the application end position is a position having a smaller curvature than that of at least another part in an application shape.

4. The application method according to claim 1, wherein the application end position is a linear position in an application shape.

5. The application method according to claim 1, wherein the liquid agent is a curable resin.

6. The application method according to claim 1, wherein the liquid agent is a liquid gasket.

* * * * *